Dec. 29, 1953
G. SLAYTER
2,664,375
METHOD FOR PRODUCING AN OPEN MESH FABRIC OF GLASS FIBERS
Original Filed March 6, 1947
2 Sheets-Sheet 1
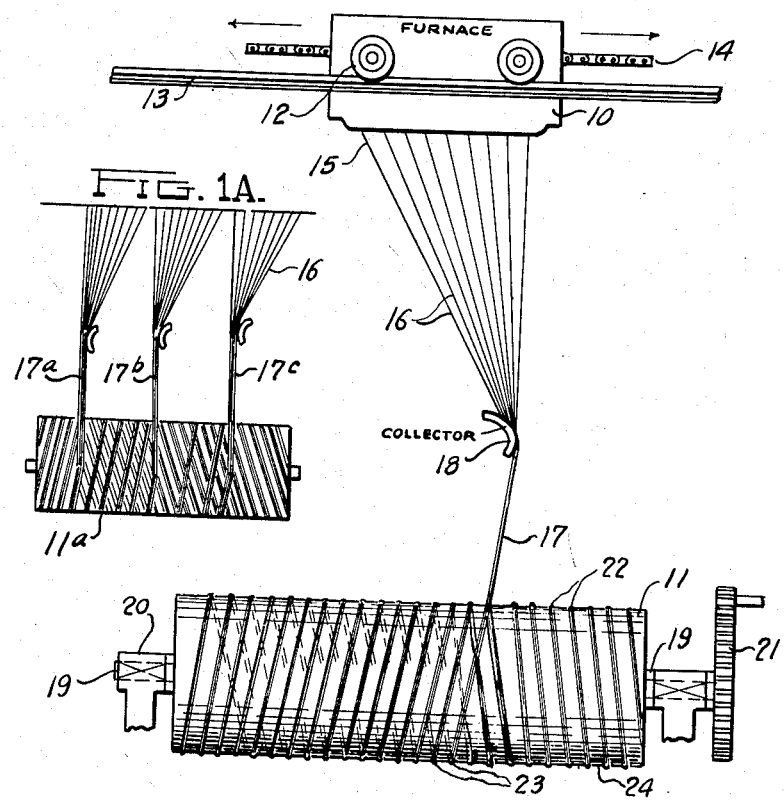
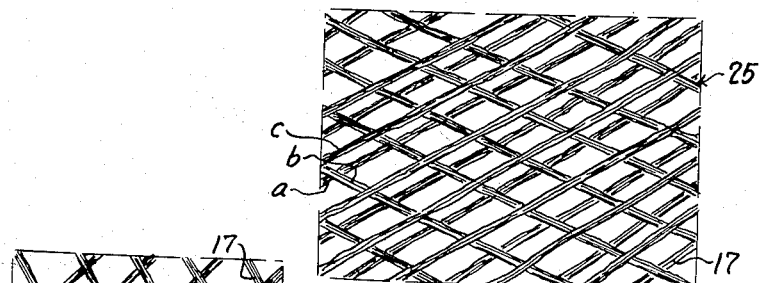
INVENTOR
Games Slayter
BY
ATTORNEYS Dec. 29, 1953 G. SLAYTER 2,664,375
METHOD FOR PRODUCING AN OPEN MESH FABRIC OF GLASS FIBERS
Original Filed March 6, 1947
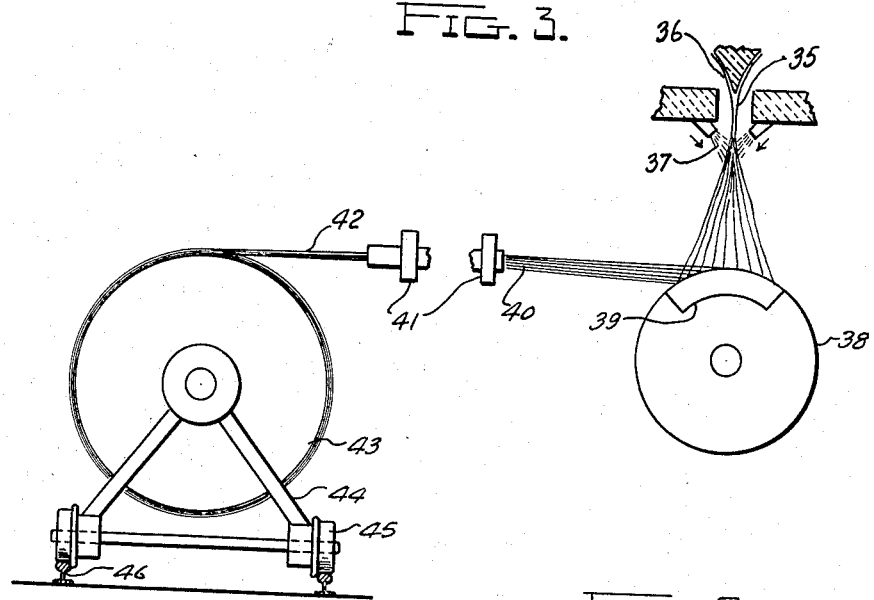
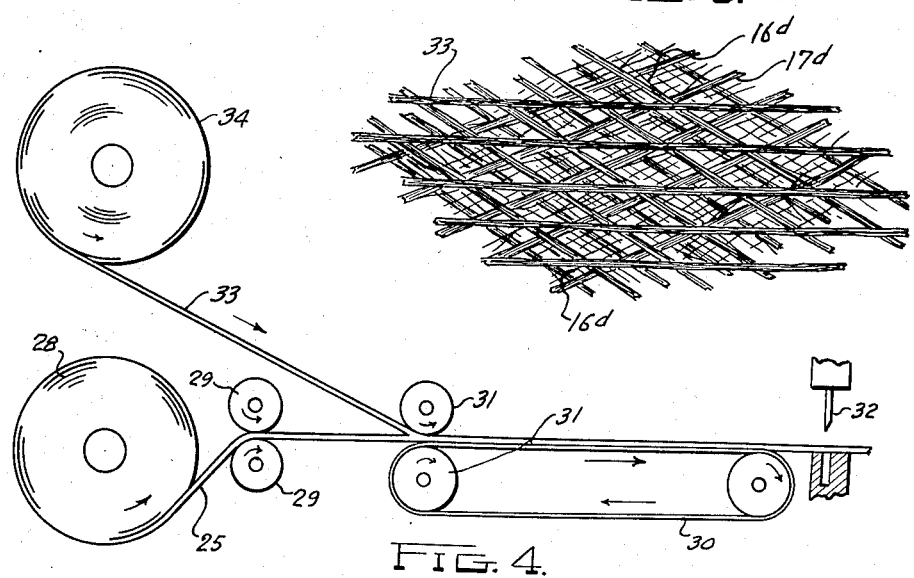
INVENTOR
Games Slayter
ATTORNEYS Patented Dec. 29, 1953

2,664,375

UNITED STATES PATENT OFFICE 2,664,375

METHOD FOR PRODUCING AN OPEN MESH FABRIC OF GLASS FIBERS

Games Slayter, Newark, Ohio, assignor to Owens-Corning Fiberglas Corporation, a corporation of Delaware Original application March 6, 1947, Serial No. 732,671. Divided and this application June 9, 1949, Serial No. 98,002

2 Claims. (Cl. 154—93)

This invention relates to a process and apparatus for producing fabrics or mats of glass fibers. One of the principal objects of the invention is to speedily and efficiently fabricate a relatively thin mat of glass fibers having the characteristics of high strength in directions in the planes of its major surfaces, porosity and formability whereby it is well adapted for application as a resinous reinforcement in molded and laminated plastics and as a reinforcing filler in shingles, separators, pipe wrap, or as an interlayer with other fabrics of lower strength, and as a base fabric to be coated in making coated cloth.

Another object of this invention is to produce by simple and inexpensive means a fabric of glass fibers having exceptionally high strengths as a result of the arrangement of the fibers predominantly as bundles of selected concentrations, which are disposed at predetermined angles relative to each other.

A further object is to produce a fabric of glass fibers which may be stretched in directions in the planes of its major surfaces to effect a rearrangement of the angular relationship between fibers that will increase the dimensions while decreasing the thickness or fiber concentrations of the fabric and at the same time improving its mass integrity without noticeable impairment of its strength, porosity or formability.

These and other objects of this invention will hereinafter appear and for purposes of illustration but not of limitation, embodiments of the invention are shown in the accompanying drawings, in which:

Figure 1 is a diagrammatic illustration of a means for manufacturing a fabric of glass fibers in cooperation with the fiber forming device;

Figure 1A is a schematic illustration of a fabric forming process employing multiple strands simultaneously as provided by one or more fiber forming devices;

Figure 2 is an enlarged perspective view of a portion of the mat produced by the process illustrated in Figure 1;

Figure 3 is a diagrammatic illustration of another unit operation for producing a mat of glass fibers in cooperation with the fiber forming device;

Figure 4 is a schematic illustration of the process for stretching the mat produced by the processes illustrated in Figures 1, 1A and 3 and at the same time combining another fabric therewith;

Figure 5 is an enlarged perspective view of a portion of the mat produced by the apparatus in Figures 1, 1A or 3 but after it has been stretched in one or more directions; and Figure 6 is an enlarged perspective view of a portion of the fabric produced by the process shown in Figure 4.

This application is a division of my co-pending application Serial No. 732,671, filed March 6, 1947, now abandoned.

The concept of this invention resides in the formation of an endless strand of a multiplicity of glass fibers and then helically winding the strand on a drum with the lead alternating between the two axial directions whereby strand layers are formed on the drum with the strands in one layer being disposed generally in the same direction but angularly with respect to the strands in the adjacent layers. The number of layers as well as the angular relationship of the strands between layers may be selected to impart the characteristics desired in the fabric, such, for example, as wall thickness, porosity, and directional strength. The fabric, when removed from the drum, may be further processed as by stretching in directions parallel with its major faces to effect relative angular movement between strands in the same layer and between strands in adjacent layers which results in thinning the fabric commensurate with the increase in the dimensions of the fabric. In the stretching, some intertangling of fibers may take place to improve the mass integrity of the final product.

The product of this invention consists first of a fabric of glass fibers parallelly arranged in the form of bundles, the bundles being disposed in multiple layers with the bundles in each layer extending generally in the same direction but at a selected angular relationship with the bundles in the adjacent layers. The product of the type described takes particular advantage of the exceptionally high tensile strength of the glass fibers and is, therefore, of high strength in most directions parallel with its major faces. It is porous and sufficiently deformable to be shaped over mold surfaces when used as a reinforcement in plastics. After the stretching, the product of this invention consists of multi-strata of glass fibers with the fibers in each stratum consisting predominantly of bundles, all of which extend generally in the same direction but at an angle with respect to the bundles of fibers in the adjacent strata. This product may be faced with a fabric of glass fibers in which the fibers extend angularly with respect to the fibers in the stretched fabric to provide for such angularity as will impart more uniform and increased strength in all directions without noticeable impairment of the porosity or formability of the fabric.

Referring now to Figure 1 of the drawings, 10 indicates a glass melting furnace adapted to reciprocate back and forth the length of a rotatable winding drum 11 over which it is mounted. The furnace 10 is supported on each side by wheels 12 which ride upon tracks 13 and the reciprocal movement of the movable furnace is effected by chains 14 driven in cooperation with the winding drum 11 or by separate power means.

The underside of the furnace 10 is provided with a bushing (not shown) having multiple openings through which streams 15 of the molten glass flows. These streams are attenuated into fine continuous filaments 16 by the winding drum 11 on which they are wound. Before being wound on the drum, the filaments 16 are gathered into a single strand 17 by a collector 18 movable coincident with the furnace 10 as by being mounted on a part of the furnace structure. At the collector 18, a sizing may be applied to the glass filaments. The sizing may be a lubricant for reducing the abrasion between the filaments, or it may be a binder which temporarily or permanently holds the filaments together in strands. For such purposes, the size may consist of an aqueous emulsion of sulfonated oils, starch, gelatin, polyvinyl alcohol, synthetic resins, and sugars separately or in various combinations.

The winding drum 11 is mounted on a shaft 19 rotatably mounted in bearings 20. The shaft and drum are rotated by suitable means, such, for example, as by gearing in engagement with the sprocket wheel 21 and, as the drum rotates and as the furnace 10 and collector 18 travel longitudinally back and forth over the length of the drum, the strand is spirally wound on the drum with the lead extending in one axial direction while the furnace is traveling in that direction and then with the lead extending in the other axial direction as the furnace reverses its direction of travel. The traversing movement between the furnace and the drum may be at a rate to deposit the strands in spaced apart convolutions, as shown, or in convolutions that are in lateral contacting relation. Thus, a layer 22 of helical strand convolutions is deposited on the periphery of the drum and then another layer 23 of helical strand convolutions is deposited over the first, the strands in the one layer crossing the strands in the other layer at an angle which is predetermined by the relative movements between the furnace and the drum.

It is manifest that multiple layers may be built up on the drum with the strands in alternate layers being disposed generally in parallel relation, though not necessarily in superposed relation, for the subsequent layers of strands may be deposited or else shift into the crevices 24 between the strands of the alternate layers. It is also apparent that this same effect may be attained if the glass melting furnace 10 and the collector 18 are held stationary while the rotating drum is shifted axially back and forth the length of the drum.

Instead of forming a single strand 17 of the group of glass filaments 16, they preferably may be gathered to form multiple strands, such, for example, as the three strands 17a, 17b, and 17c, illustrated in Figure 1A of the drawings. The group of filaments may be drawn from a single glass melting furnace or else a conjugate system of glass melting furnaces may be properly arranged. In either instance, the relative axial movement between the glass fiber forming devices and the drum 11a may be effected either by laterally traveling furnaces or else by axial reciprocation of the winding drum 11a.

The above illustrates the method of forming strands 17 in which all of the fibers lie parallelly in the bundle. However, the strand may readily consist of yarns of glass fibers in which one or more strands are twisted together but in which the fibers still extend generally in the same direction. In its manufacture, a yarn of the type described generally is divorced from the fiber forming device and as such, may be drawn from spools and wound about the drum. In this instance, a traversing mechanism ordinarily used in the guidance of a strand during winding may be used for traversing the strand the length of the drum while it is being wound, or else the spool or drum may be moved relatively as described in connection with the prior methods. One or more spools of thread or strands may be used in the winding at the same time with improved results and simplification in the process.

By either method, there is formed helical layers of glass strands 17 composed of multiple glass fibers or filaments extending generally in the same direction with the strands in each layer crossing the strands in adjacent layers at a predetermined angle. When the predetermined number of layers has been built up on the drum, the strand may be cut and redirected to another unit and the layers cut along a line axially of the drum. This enables the layers to be removed from the drum as a body, which, when opened, is in the form of a fabric 25 having a length equivalent to the circumference of the drum and a width equal to the width of the drum. The fabric thus consists of multiple layers $a$, $b$, and $c$, of strands 17 with the strands in one layer $b$ extending generally in the same direction and angularly with respect to the strands in the adjacent layers $a$ and $c$.

Depending on the amount and type of binder in the size, a fabric may be formed in which not only are the fibers firmly held in discrete bundles, but the bundles or strands themselves are so bonded to overlying bundles or strands at their crossings that relative movement of the fibers or strands is rendered difficult, whereby the fabric has the property of sufficient mass integrity to resist the stresses incident to normal handling. This bond strength may as well be obtained by the impregnation of the fabric with a suitable binder, after the fabric is formed. And again, the binder in the size may be of such intermediate strength and concentration as to retain the fibers in the strand as discrete bundles while enabling the bundles to move relative to each other in response to forces tensioning the mat in directions angularly with respect to the fiber lengths.

In the absence of any binder or a strong binder, the fabric 25 may be teased, as by drawing in any direction parallel with the major faces of the fabric other than in alignment with the strand lengths, but preferably in a direction transverse of the width of the fabric. During the drawing, the bundles of fibers are shifted angularly relative to the bundles in the adjacent layers as in the manner of a "lazy tongs" and laterally relative to each other in the same layer whereby they become further separated and enable the increase of the fabric dimensions and porosity while reducing its thickness and fiber concentrations. A stretched fabric of the type described is illustrated in Figure 5.

For this purpose, as illustrated in Figure 4, the fabric 25 may be rolled transversely into a cylinder or package 28 and then continuously fed from the cylinder between cooperating cylindrical rollers 29 which grip the fabric through its width. The fabric is carried off by an endless conveyor belt 30 having cooperating rollers 31 which receive the on-coming fabric. The peripheral speed of the cooperating rollers 31 is greater than that of the cooperating feed rollers 29 and as the fabric passes between them, it is stretched and thinned. A cutter 32 mounted forwardly of the endless conveyor belt 30 operates to subdivide the stretched fabric, a portion of which is illustrated in Figure 5 of the drawings.

As the fabric is stretched transversely of its length, the strands which originally extended generally lengthwise of the fabric at an acute angle of less than 45° of each other are adjusted to lie at a substantially greater angle to each other, such, for example, at an angle of about 60°. The rollers 31 may be adapted to draw another group of parallelly arranged strands 33 from a separate roll 34 having a width substantially equal to the fabric 25. These strands, which selectively may be formed of intertwisted or untwisted glass or other fibers, may be deposited on one or both faces of the fabric 25 after the stretching operation, as parallelly arranged strands, and in this position, they more or less intersect the angle between the strands in the fabric so that the final product is a fabric with the fibers in bundles 17d which extend in several directions preferably at angles of about 60° one from another to provide uniform reinforcing strengths in all directions. A fabric of the type described is illustrated in Figure 6 of the drawings.

This figure illustrates a fabric of glass fibers formed of continuous type fibers, that is, fibers of great and substantially continuous lengths. The fabric may equally be made of discontinuous or staple type fibers. A method of making a fabric of the latter type of fibers is illustrated schematically in Figure 3 of the drawings. In the process, streams 35 of molten glass flow from a spout 36 of a glass melting furnace (not fully shown) and the streams are attenuated by means of a gaseous blast of air or steam 37 to form fibers. These fibers are collected on a drum 38 on which they are held by means of a suction throughout the area of a suction box 39 adjacent the inner surface of the drum. As the drum rotates, and carries the fibers in the direction away from the area of the suction box, the fibers are drafted into a sliver 40 and then passed between turbinizers 41 to form strands 42. In the drafting the substantially continuous fibers are broken up into smaller discontinuous lengths. The strand may be further processed as described in direct cooperation with the fiber forming process, or else one or more strands may be twisted together to form yarns.

The strand or yarn may then be fed onto a rotating drum 43 which is supported by a rigid frame 44 mounted on wheels 45. The wheels are movable on tracks 46 to enable the reciprocation of the drum axially a distance equal to its length. Thus as the drum rotates and as it travels axially, a helical layer of strand convolutions is formed on the periphery of the drum, and as it travels in the opposite direction another helical layer of strand convolutions is formed, the strands of the latter layer crossing the strands of the first layer at an angle determined by the speed of rotation and axial movement of the drum.

Thus there is produced multiple layers of glass strands, which when cut along a line axially of the drum and removed therefrom, opens up into a fabric with the strands in each alternate layer extending generally in the same direction and at a predetermined acute angle relative to the strands in the adjacent layers. Ordinarily, binders are not applied in the discontinuous process. Thus, the stretching and thinning operations are more readily effected. In view of the discontinuity of the fibers in the threads, it is possible even to stretch the fabric in directions aligned with the fiber lengths, and the greater number of free ends of the relatively shiftable fibers which compose the strands permits interfelting to the extent that greater mass integrity is obtained.

When the mat is formed of untwisted strands, and, especially in the absence of a strong binder, some of the fibers 16d may separate from the bundle 17d under the tension of the stretching operation. These separated filaments or fibers are then shiftable laterally relative of each other in the same layer and angularly with respect to the fibers in adjacent layers. In such instances, the fiber concentrations are further reduced, while the mass integrity as a result of the intertangling of the fibers is increased.

In either process, it is desirable to apply binders to the fabric for purposes of holding the fibers together until subsequently processed to the end product whether that step be carried out in the immediate vicinity or at some other remote station.

It is manifest that a fabric of the type described may be manufactured at great speed with very little low cost equipment. The fabric, in itself, has the characteristics of predetermined uniform fiber distribution at the desired angular relationship to provide for great reinforcing strengths. The porosity and formability of the fabric allow resinous materials readily to penetrate through the fabric and enable the fabric to be draped or wrapped over relatively sharp contours or deeply drawn in molding operations. As a result, the fabric is particularly well suited for the reinforcement of resinous materials in molded or laminated plastics; as a strengthening and inert filler in shingles and pipe wraps; as a separator plate in batteries; as a reinforcing fabric between fabrics of other lower strength materials such as paper, wood, cotton and the like, or as a fabric in itself for purposes of insulation, construction, textiles and the like.

It is to be understood that numerous changes in details of construction, arrangement and operation of the parts comprising the apparatus and arrangement of the glass fibers can be effected without departing from the spirit of the invention especially as defined in the appended claims.

I claim:

1. The method of producing an open mesh fabric of glass fibers which comprises forming and gathering multiple glass fibers into an endless strand, helically winding multiple layers of the strand about a housing with the strands in one layer being angularly disposed with respect to the strands in the adjacent layers, removing the layers from the housing in a body, said layers being cut along a line crosswise of the housing in order to effect such removal, stretching the body in one or more planar directions simultaneously to enlarge the body while decreasing its wall thickness as a result of the relative adjustment between strands in each layer and the angular adjustment of strands in adjacent layers as well as the relative movement of the fibers in the strands, and then facing said body while the body is in a uniplanar position with one or more layers of a glass fabric having the fibers therein extending in parallel relation and generally in a direction which is angular with respect to the fibers in the body.

2. The method of producing an open mesh fabric of glass fibers as claimed in claim 1, in which the body of strands of fibers removed from the drum is rolled in the direction of its side walls into a package, and the body is stretched in that direction in connection with its being unrolled from the package.

GAMES SLAYTER.

References Cited in the file of this patent

UNITED STATES PATENTS

| Number | Name | Date |
| --- | --- | --- |
| 1,771,216 | Gossler | July 22, 1930 |
| 2,081,060 | Modigliani | May 18, 1937 |
| 2,234,986 | Slayter et al. | Mar. 18, 1941 |
| 2,392,805 | Biefeld | Jan. 15, 1946 |
| 2,477,555 | Roberts et al. | July 26, 1949 |
| 2,574,221 | Modigliani | Nov. 6, 1951 |